United States Patent
Sun

(10) Patent No.: US 9,189,158 B2
(45) Date of Patent: Nov. 17, 2015

(54) METHODS, DEVICES AND SYSTEMS FOR ENTERING TEXTUAL REPRESENTATIONS OF WORDS INTO A COMPUTING DEVICE BY PROCESSING USER PHYSICAL AND VERBAL INTERACTIONS WITH THE COMPUTING DEVICE

(71) Applicant: Vasan Sun, Bangkok (TH)

(72) Inventor: Vasan Sun, Bangkok (TH)

(73) Assignee: VASAN SUN (TW)

( * ) Notice: Subject to any disclaimer, the term of this patent is extended or adjusted under 35 U.S.C. 154(b) by 0 days.

(21) Appl. No.: 14/237,156

(22) PCT Filed: Mar. 28, 2013

(86) PCT No.: PCT/TH2013/000012
§ 371 (c)(1),
(2) Date: Feb. 4, 2014

(87) PCT Pub. No.: WO2014/158101
PCT Pub. Date: Oct. 2, 2014

(65) Prior Publication Data
US 2014/0298177 A1   Oct. 2, 2014

(51) Int. Cl.
*G06F 3/16* (2006.01)
*G06F 3/0488* (2013.01)
*G06F 3/023* (2006.01)

(52) U.S. Cl.
CPC .......... *G06F 3/04886* (2013.01); *G06F 3/0233* (2013.01); *G06F 3/0236* (2013.01)

(58) Field of Classification Search
None
See application file for complete search history.

(56) References Cited

U.S. PATENT DOCUMENTS

| | | | |
|---|---|---|---|
| 2003/0197744 A1* | 10/2003 | Irvine | 345/856 |
| 2005/0094475 A1 | 5/2005 | Naoi | |
| 2005/0283364 A1* | 12/2005 | Longe et al. | 704/257 |
| 2006/0159507 A1* | 7/2006 | Jawerth et al. | 400/472 |
| 2007/0038456 A1 | 2/2007 | Hsu | |
| 2008/0141125 A1* | 6/2008 | Ghassabian | 715/261 |
| 2008/0182599 A1* | 7/2008 | Rainisto et al. | 455/466 |
| 2008/0221866 A1 | 9/2008 | Katragadda et al. | |
| 2009/0199092 A1* | 8/2009 | Ghassabian | 715/261 |
| 2009/0216690 A1* | 8/2009 | Badger et al. | 706/11 |
| 2010/0031143 A1* | 2/2010 | Rao et al. | 715/261 |
| 2011/0010174 A1* | 1/2011 | Longe et al. | 704/235 |
| 2012/0326984 A1* | 12/2012 | Ghassabian | 345/168 |
| 2013/0275899 A1* | 10/2013 | Schubert et al. | 715/765 |
| 2013/0285926 A1* | 10/2013 | Griffin et al. | 345/173 |
| 2014/0207748 A1* | 7/2014 | Sood et al. | 707/706 |

* cited by examiner

*Primary Examiner* — William Bashore
*Assistant Examiner* — Henry Orr
(74) *Attorney, Agent, or Firm* — Ntellct Law, P.C.

(57) ABSTRACT

Example embodiments relate to processing user interactions with a computing device, comprising receiving a user-initiated action performed on a character button, the character button representing a character, determining whether the user-initiated action is performed in a normal or abnormal operating manner. When a normal operating manner is determined, displaying the character on a graphical display. When an abnormal operating manner is determined: identifying a previously entered character preceding the character, activating a microphone and receiving, by the microphone, a spoken word, searching a subset of a database for a textual form of the received spoken word, the subset based on one or more of the character and the previously entered character, and displaying a correct textual form of the spoken word on a graphical display by amending one or more of the character and the previously entered character when one or more of the character and the previously entered character is inconsistent with the textual form of the spoken word found in the searching.

5 Claims, 2 Drawing Sheets

METHODS, DEVICES AND SYSTEMS FOR ENTERING TEXTUAL REPRESENTATIONS OF WORDS INTO A COMPUTING DEVICE BY PROCESSING USER PHYSICAL AND VERBAL INTERACTIONS WITH THE COMPUTING DEVICE

TECHNICAL FIELD

The present disclosure relates generally to methods, systems, devices, and computer-readable medium for interacting with a computing device.

BACKGROUND

Today, a variety of methods, systems, and input devices are available for interacting with computing devices. Examples include various forms of physical keyboards, both wired and wireless, that enable users to press physical buttons (or keys) of the keyboard to interact with the computing device. Examples of interacting include typing (or inputting or entering) characters into one or more editable areas of the computing device, which may be correspondingly displayed on the computing device. Editable areas may include, but are not limited to, those found in an electronic document, such as Microsoft Office products, email, and cloud-based documents such as Google Docs documents; an executable application, such as a computer program installed on the computing device and/or remotely located, in part or in whole, such as cloud-based applications; a chat or messaging application, such as email, SMS, MMS, iMessage, Google Chat, WhatsApp, Skype, Facebook Chat, Yahoo Chat, Messenger, Blackberry Messenger, and LinkedIn; and any other input fields, as generally known by persons of ordinary skill in the art, that allow users to interact and/or edit, such as those found in websites, desktop and mobile applications, social media, and electronic documents; and the like. Other input devices include a mouse, a touchpad, and more recently, devices that recognize, among other things, human gestures and sound.

In respect to mobile computing devices, such as touchscreen-based mobile devices like the iPad, iPhone, Samsung Galaxy, HTC One, Windows-based devices like the Nokia Lumina, and Blackberry, "soft" or virtual keyboards are quickly replacing physical keyboards in popularity. Users of virtual keyboards typically require practice in order to become proficient in character entry. However, even the most experienced virtual keyboard users will often press wrong buttons and/or miss buttons on the virtual keyboard, particularly for those virtual keyboards having relatively small buttons, large buttons, closely spaced together buttons, and/or spread apart buttons. It is recognized herein that conventional methods of interacting with a computing device can be improved so as to enable users to, among other things, more accurately and more efficiently input information into a computing device.

SUMMARY

Present example embodiments relate generally to methods, systems, devices, and computer-readable medium for interacting with a computing device.

In an exemplary embodiment, a method is disclosed for interacting with a computing device, comprising receiving a user-initiated action performed on a character button of a keyboard, the character button representing a character. The method further comprises activating a microphone in response to receiving the user-initiated action. The method further comprises receiving, by the microphone, a spoken word. The method further comprises searching a subset of a database for the received spoken word and displaying a textual form of the spoken word on a graphical display when the searching returns a match.

In an exemplary embodiment, a method is described for processing user interactions with a computing device. The method comprises receiving a user-initiated action performed on a character button of a keyboard, the character button representing a character. The method further comprises determining whether the user-initiated action is performed in a normal operating manner or an abnormal operating manner. When the received user-initiated action is performed in a normal operating manner, the method further comprises displaying the character on a graphical display. When the received user-initiated action is performed in an abnormal operating manner, the method further comprises identifying a previously entered character preceding the character, activating a microphone and receiving, by the microphone, a spoken word, searching a subset of a database for a textual form of the received spoken word, the subset based on one or more of the character and the previously entered character, and displaying a correct textual form of the spoken word on a graphical display by amending one or more of the character and the previously entered character when one or more of the character and the previously entered character is inconsistent with the textual form of the spoken word found in the searching.

In another exemplary embodiment, a method is described for processing user interactions with a computing device. The method comprises receiving a user-initiated action performed on a character button of a keyboard, the character button representing a character. The method further comprises determining whether the user-initiated action is performed in a normal operating manner or an abnormal operating manner. When the received user-initiated action is performed in a normal operating manner, the method further comprises displaying the character on a graphical display. When the received user-initiated action is performed in an abnormal operating manner, the method further comprises activating a microphone; receiving, by the microphone, a spoken word; determining whether the character is preceded by a previously entered non-null character; when the character is not preceded by a previously entered non-null character, searching a subset of a database for the received spoken word based on the character and displaying a correct textual form of the spoken word on a graphical display when the searching returns a match; and when the character is preceded by a previously entered non-null character: searching a subset of the database for the received spoken word based on one or more of the character and the previously entered non-null character; and displaying a correct textual form of the spoken word on a graphical display when the searching returns a match.

In another exemplary embodiment, a system is described, comprising a graphical display; a microphone; a database; a keyboard; and a processor in communication with the graphical display, the microphone, the database, and the keyboard. The processor is operable to: receive a user-initiated action performed on a character button of the keyboard, the character button representing a character; determine whether the user-initiated action is performed in a normal operating manner or an abnormal operating manner; when the received user-initiated action is performed in a normal operating manner, displaying the character on the graphical display; and when the received user-initiated action is performed in an abnormal operating manner: identifying a previously entered character preceding the character; activating a microphone and receiving, by the microphone, a spoken word; searching a subset of a database for a textual form of the received spoken word, the subset based on one or more of the character and the previously entered character; and displaying a correct textual form of the spoken word on a graphical display by amending one or more of the character and the previously entered character when one or more of the character and the previously entered character is inconsistent with the textual form of the spoken word found in the searching.

In another exemplary embodiment, logic for processing user interactions with a computing device is described. The logic is embodied in a non-transitory computer-readable medium and, when executed, operable to cause the computing device to perform the steps of: receiving a user-initiated action performed on a character button of a keyboard, the character button representing a character; determining whether the user-initiated action is performed in a normal operating manner or an abnormal operating manner; when the received user-initiated action is performed in a normal operating manner, displaying the character on a graphical display; and when the received user-initiated action is performed in an abnormal operating manner: identifying a previously entered character preceding the character; activating a microphone and receiving, by the microphone, a spoken word; searching a subset of a database for a textual form of the received spoken word, the subset based on one or more of the character and the previously entered character; and displaying a correct textual form of the spoken word on a graphical display by amending one or more of the character and the previously entered character when one or more of the character and the previously entered character is inconsistent with the textual form of the spoken word found in the searching.

In another exemplary embodiment, a computing device is described comprising a graphical display; a microphone; a database; a keyboard; and a processor in communication with the graphical display, the microphone, the database, and the keyboard. The processor is operable to: receive a user-initiated action performed on a character button of the keyboard, the character button representing a character; determine whether the user-initiated action is performed in a normal operating manner or an abnormal operating manner; when the received user-initiated action is performed in a normal operating manner, display the character on a graphical display; and when the received user-initiated action is performed in an abnormal operating manner: activate the microphone; receive a spoken word from the microphone; search a subset of the database for the received spoken word based on the character; and display a textual form of the spoken word on the graphical display when the searching returns a match.

In another exemplary embodiment, a computing device is described comprising: a graphical display; a keyboard for interacting with an editable section displayed on the display screen, the keyboard comprising a character button representing a character; a microphone; a database comprising a textual form of a word, wherein the textual form of the word is searchable using a spoken word receivable by the microphone; and a processor in communication with the graphical display, the keyboard, the microphone, and the database, the process or operable to determine when the character button is interacted in a normal operating manner and an abnormal operating manner; wherein the processor is operable, when the character button is interacted in a normal operating manner, to add the character to the editable section; and wherein the processor is operable, when the character button is interacted in an abnormal operating manner, to activate the microphone to receive a spoken word; convert the spoken word into a form searchable in the database; search a subset of the database for a textual form of the spoken word; and display the textual form onto the editable section.

In another exemplary embodiment, a computing device is described comprising: a touchscreen display; a microphone; a computer-readable medium comprising a database; and a processor in communication with the touchscreen display, the microphone, and the database, the processor operable to: display a virtual keyboard on the touchscreen display, the virtual keyboard comprising a character button representing a character; when a character button of the virtual keyboard is pressed in a normal operating manner, display the character in an editable section displayed on the touchscreen display; and when the character button is pressed in an abnormal operating manner: activate the microphone to receive a spoken word; receive the spoken word and convert the spoken word into a form searchable in the database; identify the character and any immediately preceding non-null characters; identify a first character of the spoken word; identify a subset of the database comprising words starting with the first character and comprising the character; search the subset for a word matching the converted spoken word; when the search does not yield a match, modify the subset to comprise words starting with a related character to the first character and/or comprising a related character to the character; and display a textual form of the spoken word in the editable section.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements for convenience, it can be appreciated that each of the various example embodiments may be considered to be distinct variations.

DETAILED DESCRIPTION

Figure 1:
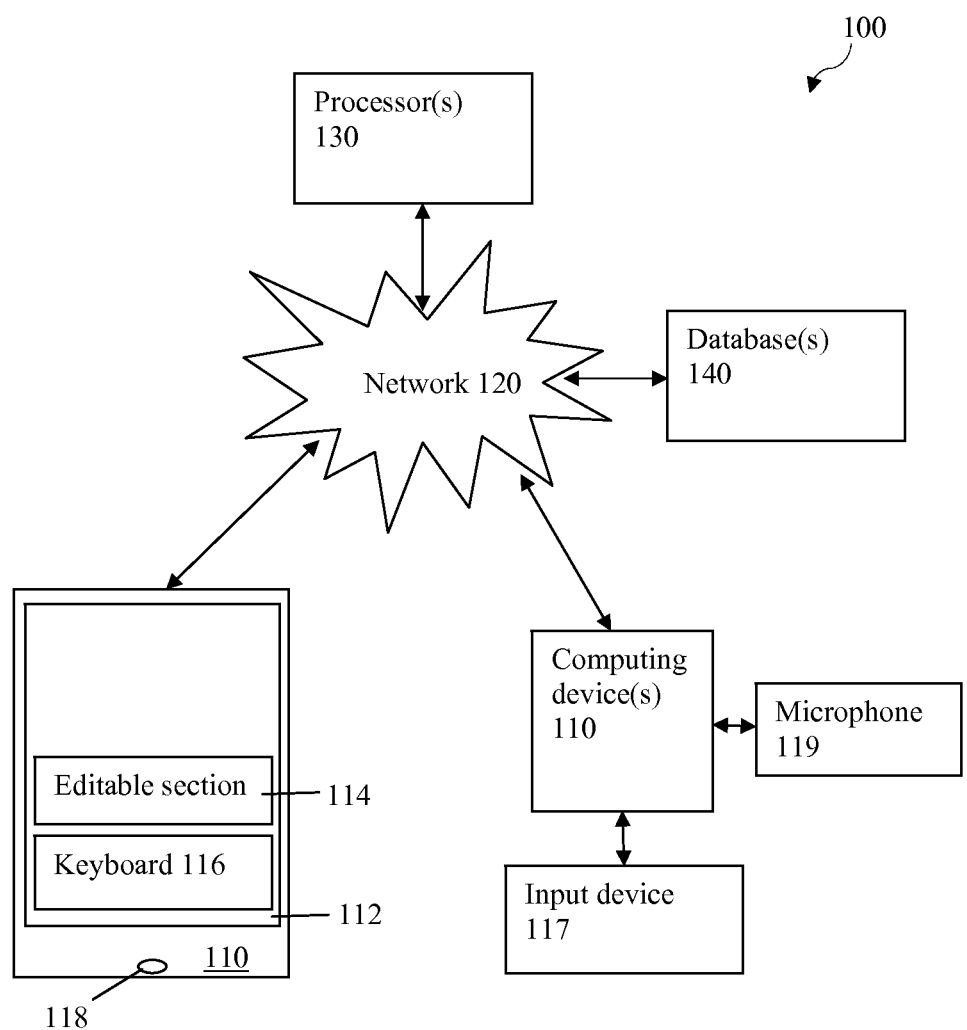
FIG. 1 is an embodiment of a system for interacting with a computing device.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items. Furthermore, as used herein, the word "press" may also mean "hit", "touch", "contact", "key", "type", "enter", "input", "slide", "swipe", or the like, when used to describe a user's interaction with a button of a keyboard. Furthermore, as used herein, the word "swipe" may also mean "slide", or the like, when used to describe a user's action of pressing down on a first button of a keyboard but releasing the press from a second button different from the first button.

Today, users of inputting devices generally encounter problems with, among other things, accuracy and speed in entering information. In respect to computing devices having touchscreen displays, such as tablets, mobile phones, wearable devices, and digital cameras, the conventional problems described herein are compounded by the fact that users of virtual keyboards are typically required to also hold the computing device as they interact with it.

Recent developments have improved user experience. For example, users presently have options to purchase various forms, shapes, and sizes of portable physical keyboards, such as those operable to communicate with the computing device using Bluetooth, WiFi, and wires. While such solutions enable users to physically touch and feel each button as they type, such solutions introduce new problems, including requiring users to carry a separate keyboard and increasing power consumption. Furthermore, many of the problems encountered with other conventional inputting devices and methods, including those described above and herein, may also present in portable keyboards. For example, users will often press wrong buttons and/or miss buttons on the portable keyboard, particularly when they have relatively small buttons, large buttons, closely spaced together buttons, and/or spread apart buttons.

As another example, recent developments have provided users with voice dictation capabilities. Such solutions, however, generally require the user to initiate dictation from an external application and/or by pressing a designated voice dictation button (ex. a button having a microphone symbol) to activate and deactivate the voice dictation feature, which can be cumbersome, tedious, time-consuming, and/or disrupt the user's train of thought. Furthermore, such solutions may not be preferable for users who do not want others nearby to coherently hear and understand the user's message. Furthermore, such solutions inherently possess technological limitations and problems. For example, the response time of a voice dictation software will generally be proportional to the size of, or number of stored recognizable words in, a corresponding database. Furthermore, other limitations, such as those pertaining to device processing speed, memory cache, and network connectivity and speed (for those wherein the database and/or processing occurs remotely, such as in the cloud), and speech recognition parsing and analysis may require the user to speak slowly and/or cause a prolonged pause inbetween words, which is unnatural. A further limitation in voice dictation pertains to the general notion, as reflected in various independent studies regarding voice recognition technology, that the success rate of voice recognition will vary among users and the overall accuracy in reducing spoken words to text will decrease as the number of spoken words increases; and one of the most difficult (or least accurate) aspects of a spoken word to accurately and efficiently process and reduce to text is often the first sound (ie. typically the first letter of a spoken word) of the spoken word. Furthermore, in some situations, after typing the first one or more letters (such as "d", "i", and "a") of a desired word (such as "diarrhea"), a user may realize that he/she does not know how to correctly spell the word (ex. is the "a" followed by an "r" or an "h"?). A user having a voice dictation feature may press a designated voice dictation activation button to launch the voice dictation feature and speak the word. It is recognized herein that a problem arises in such situations since the voice dictation feature, when finding a match for the spoken word (such as "diarrhea"), will append/add the textual form of the word to the already typed first one or more letters. An example undesirable result will be the incorrectly spelled word "diadiarrhea". If the user realizes the error, the user will be required to waste time and efforts to go back and delete the first three letters. Otherwise, the user will have typed an incorrect word.

As another example of recent developments, computing devices, such as those described above, often include features for "auto-completing" or predicting what a user intends to type after the user presses on a certain minimum number of buttons. This solution, however, is not without its own problems. For example, this prediction method will typically require the user to type at least three or more characters before the prediction functionality kicks in. It is recognized herein, however, that because the overall accuracy of typing generally reduces as a user types more characters, the overall accuracy of typing three (or more) characters will generally be less than typing two characters, and likewise, the overall accuracy of typing two (or more) characters will generally be less than typing one character. A direct consequence of this is the often-encountered problem of typing one or more incorrect characters before the prediction software kicks—causing the prediction to incorrectly predict or not be able to predict at all.

As another example of a problem with prediction methods, even if a user correctly enters the first three or more characters, such methods typically provide the user with several predicted (or suggested) words (in a list), which then requires the user to select, such as by touching, tapping, or using arrow keys, the desired word (if any). For example, if a user enters the letter "d", the system will wait for the next letter. If the user follows with an "i", the prediction software will continue to wait for a third letter. If the user then enters an "a", the prediction software may provide suggestions, such as "diabolic", "diagram", "diameter", "diarrhea", etc. If the user sees a suggested word that matches what the user intends, such as "diarrhea", the user can either continue typing the next letter, such as "r", to further filter the predicted words or accurately select (tap) the word "diarrhea" from the list. In respect to the latter, a further problem arises when a user unintentionally selects the wrong word from the list. In general, although prediction methods are generally quicker in the long run than having to type every character in a word, it is recognized herein that oftentimes a user may spend more time correcting incorrectly entered characters and/or incorrectly selecting predicted words from a list of predicted words.

Present example embodiments relate generally to an information input method, system, device, and computer-readable medium, including those pertaining to a virtual or physical keyboard that, when installed or connected, may solve many of the above problems encountered in conventional methods.

An example embodiment of a keyboard enables a user to press a button (or key), or a graphical or visual rendition thereof, in a normal operating manner to interact with the computing device, such as to add a character corresponding to the pressed button, onto an editable section displayed on the computing device. Although some example embodiments described hereinafter may be directed to virtual and/or physical keyboards of computing devices, it is to be understood herein that example embodiments may also be directed to other types of information inputting methods, systems, and devices, including portable physical keyboards, keyboards that are projected onto a surface, such as a tabletop or wall, and keyboards that enable users to interact using gestures and/or voice.

As used herein, "pressing a button" includes pressing a button of a physical keyboard, a button of a virtual keyboard on a touch-screen, and/or a button of a virtual or projected keyboard projected onto a flat surface. Furthermore, as used herein, "normal operating manner" includes interacting with a button, including pressing a button, for not more than a "typical typing duration". In this regard, pressing a button in a normal operating manner is generally performed when there is an intent to add and/or display a single character corresponding to the pressed button. Furthermore, as used herein, an "abnormal operating manner" may include any user-initiated act that is not a normal operating manner. For example, an abnormal operating manner may include the pressing of a button for more than the typical typing duration, the swiping from a button to another area (such as to another button or to an area that is not a button), the pressing of a button and shaking in or about the same time (such as shaking of a computing device having an accelerometer, or the like), or the like. Furthermore, as used herein, "typical typing duration" includes any amount of time ($T_{typical}$) less than or equal to a maximum amount of time ($T_{threshold}$) that a button of a keyboard can be pressed so as to result in a single character being added or displayed. It is to be understood herein that $T_{threshold}$ may be a pre-set duration that is commonly used in conventional keyboards, such as 1 second, configurable by the user, and/or adaptable based on the user's typing habits.

It is recognized herein that a button of a keyboard pressed for more than $T_{threshold}$ typically results in repeatedly adding the character or popping up of a box (in the case of a virtual keyboard) comprising alternative characters to choose from. Furthermore, in some virtual keyboards, when a user presses down on a button (such as the letter "t") and slides (or swipes or moves while still contacting the screen) to another button before releasing (i.e. the release of the depression occurs at a different button, such as the letter "p"), the result may be the adding of the character of the latter button (in this case, the letter "p").

Example embodiments of the keyboard may be distinct from conventional keyboards in several ways. For example, pressing of a button (such as the button for the letter "t") for a duration greater than $T_{threshold}$ may not repeatedly add a character or pop up a window comprising alternative characters, although it may. As another example, pressing of a virtual button and releasing contact from a different button (such as the above-described "swiping" or sliding along a touch screen of a mobile device) may not necessarily add the latter button, although it may.

As illustrated in FIG. 1, example embodiments of system 100 comprises a computing device 110, such as a mobile device, and optionally an attached keyboard 117, an attached microphone 119, and a network 120. The computing device 110 comprises a touch-screen 112 or screen projected onto a flat surface (not shown) operable to receive physical interactions and/or gestures/sounds from a user, a microphone 118 integrated or built into the computing device 110, and a virtual keyboard 116 installed therein operable translate the physical interactions into a pressing of a button of the virtual keyboard 116. It is to be understood herein that the virtual keyboard 116 may be configurable in a plurality of ways, including those in the form of a QWERTY configuration and those for languages other than English, and such configurations may be changeable and/or configurable by the user.

Figure 2:
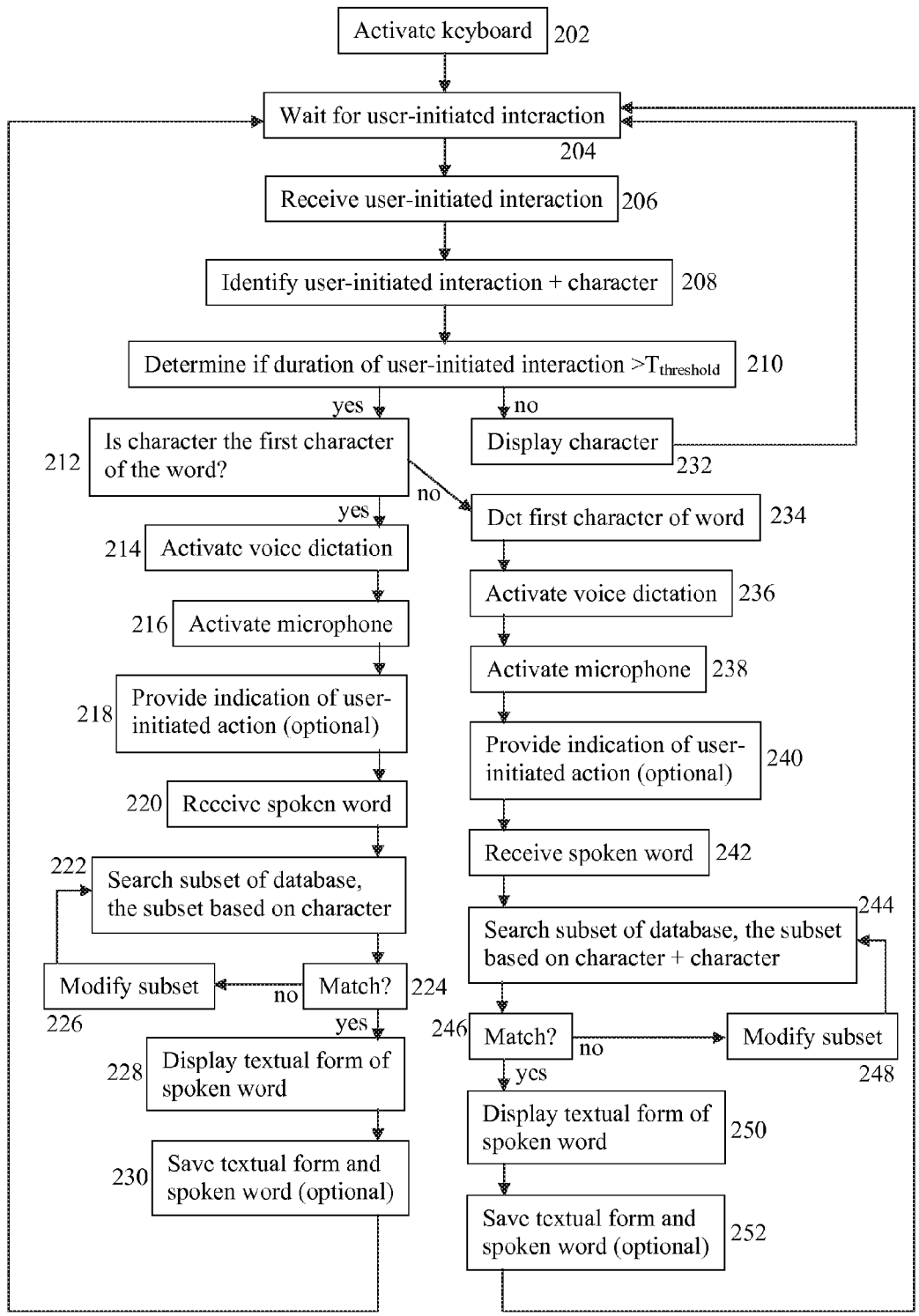
FIG. 2 is an embodiment of a method for interacting with a computing device.

In an example embodiment illustrated in FIG. 2, a keyboard is activated in and/or connected/attached 202 to the computing device 110. One or more editable sections 114 displayed on a graphical display 112 may be active, that is, when an application, program, or the like, running on the computing device 110 allows for a user to interact by pressing a button of the keyboard 116, 117. Computing device 110, or processor thereof, will wait for a user-initiated interaction 204. Upon receiving a user-initiated action 206, such as a button press, computing device 110 identifies 208, and optionally saves, the user-initiated action and the character ("pressed character") associated with the pressed button (ex. the letter "t"). Computing device 110 may also keep track of how long the button is pressed before being released 210. After the button is released, the computing device 110 determines if the duration of the button press ($T_{press}$) is greater than $T_{threshold}$ 210. If $T_{press}$ is less than or equal to $T_{threshold}$ ($T_{press} < T_{threshold}$), as indicated by "no" in FIG. 2, computing device 110 proceeds to display the character 232, that is, add the pressed character (ex. letter "t") to the one or more active editable sections 114 of the graphical display, and returns back to waiting for a next user interaction 204.

If, however, $T_{press}$ is greater than $T_{threshold}$ ($T_{press} > T_{threshold}$), as indicated by "yes" in FIG. 2, computing device 110 may not immediately add the character to the editable section 114 (ex. "t" not added to editable section). That is, before doing so, the computing device 110 may determine if the pressed character is a first character of a word 212 by, for example, determining if there is a non-null character that has been entered immediately before the pressed character (an "immediately preceding non-null character", such as the letter "s" before the pressed character "t"). As used herein, a non-null character will refer to a character that is not a space, tab, or null character. If there is no immediately preceding non-null character, as indicated by "no" in FIG. 2, the pressed character is used to perform the next steps, which may optionally include saving the pressed character. In this situation, the pressed character will be referred to as the "target character". In example embodiments, the pressed button may be optionally deactivated. Furthermore, some or all of the remaining buttons of the keyboard 116, 117 may also be optionally deactivated. As used herein, the deactivating of one or more buttons will refer to temporarily restricting a user from entering the character of the button until one or more actions is performed and/or received. For example, after one or more of the buttons become deactivated, a subsequent pressing of one or more buttons, such as the target button or the "ESC" button, may reactivate the buttons and return back to waiting for a user interaction.

The computing device 110 then proceeds to activate 214 an example embodiment of voice dictation (a procedure, function, program, and/or application), which may reside (installed) in the computing device 110, remotely from the computing device 130, such as in the cloud 120 or internet 120, or both. Example embodiments of the voice dictation, when activated as described above, intern activates 216 the microphone 118, 119. It is to be understood that the activated microphone 118, 119 can be the microphone 118 built into the computing device 110 and/or a peripherally attached microphone 119.

In or about the time that the microphone 118, 119 is activated 216, the pressed button may optionally be highlighted 218 for the user to see, such as by changing the color of the pressed button, causing the pressed button to appear pressed, and/or causing the pressed button to blink. Alternatively or in addition, a haptic feedback response, as known in the art, may optionally be provided to the user in or about the time of activating the microphone. The microphone 118, 119 then waits for a spoken word from the user. Upon receiving a spoken word 220, which is understood by persons of ordinary skill in the art to be in analog (or raw) form, the computing device 110 optionally saves the raw spoken word and deactivates the microphone 118, 119. The computing device 110, and/or one or more processors 130 located remotely that are in communication with the computing device 110, is/are then operable to convert the raw spoken word into a digital form. The digital form of the spoken word is then optionally saved. Example embodiments of the voice dictation may then be operable to process the digital spoken word, as follows: instead of searching an entire or most of a database of spoken words (in digital form), the processor(s) may start by searching only a specific subsection or subset of the database 222, such as one comprising of only words that begin with the target character (ex. the letter "t"). It is to be understood herein that the database (not shown) may reside in the computing device 110 and/or reside in one or more remote databases (140). It is recognized herein that example embodiments provide for, among other things, a more quick, efficient, and accurate way to perform voice dictation. For example, since only a relevant portion of the database is firstly searched, the searching time and processing efforts becomes significantly reduced. Furthermore, since the first letter of the intended word is known (provided by the user by way of pressing the letter for a duration greater than $T_{threshold}$ ($T_{press} > T_{threshold}$)), one of the more difficult aspects of a spoken word to analyze, which is typically the first sound (or letter), is no longer a problem. In example embodiments, the identification of the pressed character and/or the first character may be performable before or after activating the voice dictation, activating the microphone, and/or receiving the spoken word.

In situations wherein the search does not find a match, as indicated by "no" in FIG. 2, example embodiments may modify the subset 226 being searched. For example, the subset may comprise words having one or more other letter(s) (such as one or more immediately preceding non-null characters), and may also comprise the pressed character. The subset may also comprise, in addition to or in replacement of the above, words that start with and/or comprise character(s) having a relation to the target character, such as by sound and/or button location. For example, if the pressed character is the letter "c", the next search(es) may be in a subset of words that start with and/or comprise the letter "s" or "k" or both, and so on. As another example, if the pressed character is an "i", the next search(es) may be in a subset of words that start with and/or comprise a character of one or more neighboring buttons, such as the character "u", "o", "j", "k", and/or "l". This may be advantageous in view of users oftentimes accidentally pressing a neighboring button to the intended button. The subsets described herein may be combinable and/or replaceable with other approaches. It is recognized herein that example embodiments of subsets, including the dynamically selecting of one or more appropriate subsets based on, among other things, the pressed character, one or more immediately preceding non-null characters, the first character, related characters, neighboring characters, user typing patterns, previously stored information pertaining to matched textual forms of previously spoken words, and the like, may provide improvements over conventional methods.

When the search of the digital spoken word returns one or more matches, as indicated by "yes" in FIG. 2, example embodiments of the voice dictation function may be operable to add the matched word to the editable section 228 and/or provide to the user a selection of closest matched words 228 (such as by way of a pop-up window, or the like). The previously deactivated pressed button, if deactivated, then becomes re-activated, and the keyboard 116, 117 returns back to waiting for the next user-initiated interaction 204. It is to be understood that the pressed button and other buttons may not be deactivated at all, which would advantageously allow the user to continuously type other buttons after pressing the pressed button for greater than $T_{threshold}$ (or swiping, which will be explained later). In this regard, the pressing of the pressed button for greater than $T_{threshold}$ may be accidental or the user may decide to cancel the voice dictation function and continue typing.

In example embodiments, a designated character button, such as the ";" button or a special button may be operable to search a special database of words for a received spoken word. The special database may include user-customizable words, specific words of a particular subject matter, or the like.

In example embodiments, in or about the time a matched word is found and/or displayed/added, computing device 110 (or one or more processors 130 in remote communication with computing device 110) is optionally operable to save 230 information pertaining to the match for future use. For example, an association of the spoken word, the digital form of the spoken word, and/or the textual form of the matched spoken word may be saved into a database, such as the same database, a new subset of the same database, and/or a new previously matched words database, for future use. In example embodiments, this database may be the first database to be searched in future searches, which may enable further improving of response and/or processing time. If this database is the first database searched and no matches are found, the above-described example embodiments of searching are then subsequently performed.

In example embodiments wherein the pressed character is not a first character of the spoken word, such as when an immediately preceding non-null character is found (ex. the letter "i"), the pressed character (ex. the letter "a") may be saved and the immediately preceding non-null character may be identified and saved. The computing device may then proceed to determine the first character 234, such as by repeating the process by determining whether there is an immediately preceding non-null character (ex. the letter "d") before the identified immediately preceding non-null character. This may go on until there are no more immediately preceding non-null characters (ie. the first letter of the word is reached). Collectively, the first character and all immediately preceding non-null characters will be referred as "previous characters" of the pressed character. The last immediately preceding non-null character (ex. the letter "d"), which corresponds to the first character of the intended word (or spoken word), may then become the "target character". It is to be understood that the target character(s) may also be one or more of the pressed character, one or more previous characters, and/or the first character. Example embodiments are then operable to perform substantially the same operations as described above, as indicated by reference numbers 236, 238, 240, 242, 244, 246, 248, 250, and 252 for searching a matched word from one or more subsections of the database using one or more of the pressed character, previous characters, and first character. It is recognized herein that the scope of the search (the size of the database or subset of the database being searched) may be further reduced to only those words comprising or starting with the pressed character and some or all of the immediately preceding non-null characters. For example, the subset of the database searched may comprise words beginning with characters "d", "i", and "a" to match the spoken word. If there are no matches from this subset search, the subset of the database searched may be modified to comprise words having the characters "d", "i", and "a" in any order. If there are no matches from this subset search, the subset of the database searched may be modified to comprise words beginning with the characters "d" and "i". And so on until a match of the spoken word is found.

It is recognized herein that situations may arise wherein the first character, the one or more previous characters, and/or the pressed character are incorrectly entered (either incorrect character and/or order) by the user. For example, a user attempting to type the word "diarrhea" may have entered the first character "d", previous characters "i", "a", and "h", and the pressed character "r" (as previously described, the pressed character may correspond to the character which received a user interaction in an abnormal operating manner, such as pressing of the character button for greater than a threshold duration, swiping, shaking, and/or rotating a press point about a character button). In example embodiments, such incorrectly entered characters are determinable when performing a search based on the received spoken word. When it is determined that one or more of the entered characters, which may include a first character, one or more previous characters, and the pressed character, are entered incorrectly, example embodiments are operable to perform amendments (or replacement, deletion, or addition) to and/or about one or more of the entered character(s), including the incorrectly entered character(s). In other words, an overall correct textual form of the spoken word is provided, and in doing so, previously entered characters are also considered and amended, if necessary. In the above example wherein the spoken word is "diarrhea" and entered characters are first character "d", previous characters "i", "a", and "h", and pressed character "r", example embodiments will provide the textual form "diarrhea" instead of, for example, "diahrdiarrhea" or "diahrrhea". In situations wherein the entered characters are correctly entered (correct characters and order), such as the first character being "d", the previous characters being "i", "a", and "r", and the pressed character being "r", example embodiments are operable to either add/append the remaining characters to complete the textual form of the spoken word "diarrhea", such as adding/appending the letters "h", "e", and "a", and/or replace one or more of the entered characters. Either way, example embodiments are operable to provide the correct textual form "diarrhea" instead of, for example, "diarrdiarrhea". It is recognized herein that conventional problems encountered, such as the appending/adding of the textual form of the matched word to the entered characters (which may include the first character, the one or more previous characters, and the pressed character), can be solved by example embodiments. Furthermore, since a user-initiated action to trigger or activate an abnormal operating manner in example embodiments are performable about one or more character buttons (such as character button "d"), which represents a character (such as character "d" or "D"), it is recognized herein that example embodiments enable a user to continue typing as one would normally do and need not look for a designated voice dictation application icon when such is needed. That is, as the user is typing in a normal manner, the user may engage and disengage voice dictation in example embodiments without leaving the proximity of the character buttons of the keyboard. It is also recognized herein that example embodiments do not require voice dictation to be "always-on", which may include continuously recording and performing voice to text conversion, which is recognized herein to cause problems, including draining of battery, unnecessary consumption of energy, unnecessary occupying of temporary memory storage, and bogging down of one or more processors.

In another example embodiment, in addition to or instead of determining whether or not a button is pressed based on $T_{threshold}$, the user-initiated action or interaction that is an abnormal operating manner may include other forms of user-initiated actions. For example, example embodiments, as described above and herein, may activate upon a user swiping or sliding from a first button to another part of the touchscreen, such as to one or more other buttons or away from the virtual keyboard (pressing on a first button but releasing from a second button or to a section of the display touchscreen that is not the virtual keyboard). In an example embodiment, the character representing the first button may be the pressed character. In other example embodiments, the character representing the first button may be the last immediately preceding non-null character and the second button may be the pressed character. In this case, some or all buttons pressed during the swipe or slide between the first button and the second button may also be called an immediately preceding non-null character for the purposes of the search, as described herein. Thereafter, example embodiments are operable to perform substantially the same operations as described above and herein for finding the matched word or words from one or more subsets of the database. In another example embodiment, the abnormal operating manner may comprise pressing a button and shaking the computing device, wherein the computing device comprises an accelerometer, or the like, operable to receive device movement(s) and translate the movement(s) into instructions to perform activating of the voice dictation, etc.

In the example embodiments described herein, a space (such as ASCII "32" or HTML " ") may be added after a matched word is displayed. This may be particularly advantageous for users when the interacting with the computing device involves inputting sentences into an editable section since the user need not press the space button before proceeding to the next word. Alternatively or in addition, example embodiments are operable to predict or guess whether a next word will follow the matched word. In this regard, if the matched word is predicted to be a last word in a sentence, a space may not necessarily be added after the matched word is displayed, although it may. If a space is not added, the user may proceed to complete the sentence with a period, question mark, exclamation mark, or the like. Alternatively or in addition, example embodiments are operable to add a space after adding the matched word and subsequently remove or delete the added space when a user enters a period, question mark, exclamation mark, or the like.

Example implementations for the above described example embodiments are now provided below.

Example 1

An example embodiment of a computing device 110, such as a mobile phone, comprises a touchscreen 112, a processor (not shown), a built-in microphone 118, and a computer readable medium (not shown). The computer readable medium comprises a database (not shown) and instructions for example embodiments of the virtual keyboard application 116. In operation, a user may cause the processor to initiate (or activate) example embodiments of the virtual keyboard application 116 in one or more of a plurality of ways, such as by tapping or touching onto an editable section 114 displayed on the display screen. In the present example, the editable section 114 may be an input field in a chat application, such as WhatsApp or iMessage, and the user may desire to input a series of words, such as "it appears I have a mild case of diarrhea." Since a user may be readily able to type short words, such as "it", "i", "a", and "of", the user may not activate the voice dictation functionality. Instead, the user may start by pressing "i", followed by "t", followed by the space button. For the word "appears", the user may press and hold the letter "a" for a duration greater than $T_{threshold}$. In doing so, the processor performs the instructions of the installed virtual keyboard application 116 by first identifying the pressed button as corresponding to the letter "a" and determines that the user has pressed the "a" button for greater than $T_{threshold}$. The processor also recognizes that there are no immediately preceding non-null characters. The processor then activates the microphone 118 and waits for a spoken word from the user. To prompt the user and/or let the user know that he/she should speak the intended word, the "a" button (or any other buttons or indications) may optionally be highlighted in red or any other color. Upon receiving the spoken word "appears" from the user, the processor performs the voice dictation procedure, which may include a conversion of the raw spoken word into a digital form of the spoken word in any manner known by persons of ordinary skill in the art. Thereafter, the processor may call one or more subsections of the database comprising only words that start with the letter "a" and perform a search of the spoken word "appears". If a match is found, the processor places the matched word "appears" into the appropriate position of the editable section 114. Either before or after the search, the processor may de-activate the microphone 118. In or about the same time the match is found, the processor may re-activate the "a" button (or any other deactivated buttons if the one or more buttons were deactivated, which is optional) and returns to waiting for a user interaction. In this example, the user may continue to press the letter "i", followed by the space button, and may press the "h" button for a duration greater than $T_{threshold}$. The processor then performs the same series of steps, as described above for the spoken word "have". And so on.

It is recognized herein that example embodiments provide for fast, efficient, and accurate entering of information by uniquely combining the use of character keys of a keyboard 116, 117 with voice dictation, as described above and herein. In this regard, example embodiments may not require users to launch external voice dictation applications by looking for and pressing designated voice dictation buttons or icons, although it may, but instead allow users to continue typing as they normally do, and launch example embodiments of voice dictation when they want or when they need. For example, when a user intends to type the word "diarrhea", after typing the letters "d", "i", and "a", the user may realize that he/she is unsure of how to spell the word—that is, whether the next letter should be a "r" or an "h". It is recognized herein that conventional methods would generally require the user to use the backspace or delete button to delete what has been typed (the letters "d", "i", and "a"), and launch a dictionary or conventional voice dictation application, which is time-consuming and troublesome. Present example embodiments enable the user to simply press and hold a button (such as the "a" or "r" or "h" button) and speak the word "diarrhea", thereby saving the user time, effort, and making text entry more accurate.

Example 2

The above Example 1 may also be operable in example embodiments by swiping, sliding, shaking, rotating a pressed point about a character button, and/or performing other movements of a pressed point about a character button (such as moving a finger back and forth when pressed on a character button), as described above and herein, in addition to and/or in replacement of pressing a button for greater than $T_{threshold}$.

Example 3

Example embodiments, including the above Examples 1 and 2, may also share processing, searching, and database storage 140 with one or more processors 130 located locally (such as on the same WIFI network) and/or remotely, such as in the cloud 120. In such an example, the computing device 110 may be operable to connect, either by wires or wirelessly, to the internet 120, an intranet 120, a WIFI network 120, or the like. In example embodiments, when a user presses on a button for a duration greater than $T_{threshold}$ (or swipes or slides or shakes, as described above), the processor of computing device 110 may perform instructions of example embodiments of the keyboard to identify the pressed button, activate the microphone, receive the raw spoken word, and optionally convert the raw spoken word to a digital spoken word. Thereafter, the digital spoken word (or raw spoken word) may be sent by the processor to one or more remote processors 130, such as those in the cloud 120, whose task may be to search a database 140 to find one or more matching words in text form. When one or more matches are found, the text form(s) of the spoken word is/are sent back to the computing device 110, and the processor then places the text form of the spoken word into the appropriate part of the editable section 114. It is recognized herein that such example embodiments may be beneficial to users, including those who utilize more than one computing device 110 (such as a mobile device, tablet, personal laptop, work laptop, televisions, media players, and devices having cloud computing capabilities), and/or require searches in specialized or industry-specific databases.

Example applications for the example embodiments described herein include interacting, including inputting of information, into an editable section displayed on the graphical display. Editable sections may include, but are not limited to, those found in an electronic document, such as Microsoft Office products, email, and cloud-based documents such as Google Docs documents; an executable application, such as a computer program installed on the computing device and/or remotely located, in part or in whole, such as cloud-based applications; a chat or messaging application, such as email, SMS, MMS, iMessage, Google Chat, WhatsApp, Skype, Facebook Chat, Yahoo Chat, Messenger, Blackberry Messenger, and LinkedIn; and any other input fields, as generally known by persons of ordinary skill in the art, that allow users to interact and/or edit, such as those found in websites, desktop and mobile applications, social media, and electronic documents; and the like. Other example applications may include computer programs that assist users in, among other things, inputting of information, learning a language, such as English, how to spell words, check the spelling of words, and teach kids how to associate a letter with words, graphics, and/or sounds. Example embodiments of a system, computing device, and/or processor described herein may be directed to desktop computers, all-in-one computers, laptops, notebooks, ultrabooks, readers, televisions, appliances, tablets, phablets, mobile phones, PDAs, music players, video players, media players, Blue Ray players, DVD players, home theater components, digital cameras, internet kiosks, check-in terminals, ticketing terminals, information terminals, a plurality of computing devices interacting together in part or in whole, and other specialized computing devices, including arcade games, tabletop replacement devices, and industry-specific computing devices. Example embodiments described herein may also be directed to wearable computing devices, including glasses (such as Google Glasses). In such applications, it is to be understood that the user-initiated interactions or actions may include gestures and/or voice.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, as referred to herein, a computing device, communication device, or capturing device may be a virtual machine, computer, node, instance, host, or machine in a networked computing environment. Also as referred to herein, a network or cloud may be a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A network or cloud may include, but is not limited to, computing grid systems, distributed computing environments, cloud computing environment, etc. Such network or cloud includes hardware and software infrastructures configured to form a virtual organization comprised of multiple resources which may be in geographically disperse locations.

Although various computer elements, communication devices and capturing devices have been illustrated herein as single device or machine, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to" shall mean sufficiently close to have a material effect upon the respective system element interactions.

Additionally, the section headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A computing device comprising:
   a touchscreen display;
   a microphone;
   a computer-readable medium comprising a database; and
   a processor in communication with the touchscreen display, the microphone, and the database, the processor operable to:
      display a virtual keyboard on the touchscreen display, the virtual keyboard comprising a character button representing a character;
      when the character button representing the character of the virtual keyboard is pressed in a normal operating manner, display the character in an editable section displayed on the touchscreen display; and
      when the character button representing the character is pressed in an abnormal operating manner:
         activate the microphone to receive a spoken word;
         receive the spoken word and convert the spoken word into a form searchable in the database;
         identify the character of the pressed character button and all immediately preceding non-null characters displayed in the editable section of the touchscreen display before the receiving of the spoken word;
         identify a first subset of the database, the first subset comprising words having all of the identified immediately preceding non-null characters and the identified character of the pressed character button in any order;
         search the first subset for a textual form of the received spoken word;
         when the search of the first subset yields a match:
            perform a first amending of one or more of the identified immediately preceding non-null characters and/or the identified character of the pressed character button displayed in the editable section based on the textual form of the received spoken word found in the search; and
            display the textual form of the received spoken word in the editable section based on the first amending;
         when the search of the first subset does not yield a match:
            select a second subset comprising words having one or more of the identified immediately preceding non-null characters in an order different from the order of the identified immediately preceding non-null characters used in the first subset and not having the identified character of the pressed character button;
search the second subset for the textual form of the received spoken word;
perform a second amending of one or more of the identified immediately preceding non-null characters and the identified character of the pressed character button displayed in the editable section based on the textual form of the spoken word found in the said searching of the second subset; and
display the textual form of the spoken word found in the searching of the second subset in the editable section based on the second amending.

2. The computing device of claim 1, wherein the abnormal operating manner comprises a pressing down on the character button for greater than a threshold duration.

3. The computing device of claim 1, wherein the abnormal operating manner comprises swiping from the character button to an area different from the character button.

4. The computing device of claim 1, further comprising displaying more than one textual forms of the spoken word on the touchscreen display when the searching of the second subset returns more than one match, wherein one of the textual forms being user-selectable from among the more than one displayed textual forms.

5. The computing device of claim 1, further comprising storing, in the database, information pertaining to matched spoken words.

\* \* \* \* \*